May 6, 1969 A. J. IORILLO 3,442,468

NUTATION DAMPED STABILIZED DEVICE

Filed Nov. 14, 1966

Anthony J. Iorillo,
INVENTOR,
BY.
J. K. Haskell
ATTORNEY.

United States Patent Office 3,442,468
Patented May 6, 1969

---

3,442,468
NUTATION DAMPED STABILIZED DEVICE
Anthony J. Iorillo, Santa Monica, Calif., assignor to Hughes Aircraft Company, Culver City, Calif., a corporation of Delaware
Continuation-in-part of application Ser. No. 567,487, July 25, 1966. This application Nov. 14, 1966, Ser. No. 594,021
Int. Cl. B64d 45/04, 45/08; F42c 13/00
U.S. Cl. 244—1     23 Claims

ABSTRACT OF THE DISCLOSURE

A stabilized device comprising at least a pair of relatively rotatable coupled bodies. One of the bodies is a sensibly non-rigid rotor and the other is a despun platform. The ratio of the spin moment of inertia of the rotor with respect to the moment of inertia of the bodies about any other axis is less than unity. The rotor supports elements to render it non-rigid such as nozzles to control precession or velocity, liquid containing tanks, instruments, motors, etc. The despun body supports elements such as cameras, antennas, sensors, flexible elements, weights, etc. Nutational stability of the entire configuration is achieved by making the despun body nonrigid so that the despun body opposes nutation by dissipating energy, e.g., by coupling a passive energy dissipating damper such as a dashpot or movable mass to the despun body or by control of a despun body such as an asymmetrically disposed or configured despun body and/or dampers associated with the despun body.

---

This application is a continuation-in-part of application Ser. No. 567,487, filed July 25, 1966 now abandoned, entitled, Spacecraft Having Spun and Despun Elements, and assigned to the present assignee.

This invention relates to spin stabilized devices or vehicles operable in differing environments in differing operational modes, such as a fluid supported mode of operation, a zero gravity mode of operation or other defined or random mode of operation.

Devices or vehicles of this general character are employed in applications ranging from the laboratory to outer space.

In the laboratory such devices or vehicles are usefully employed as environmental test beds duplicating the essential modes of environmental operation, including force suspension inhering spatial freedom, providing a basis for testing or proving spin stability, attitude control and the performance of instrumentation, etc.

In operation in space such devices or vehicles are useful as communication links and as scientific devices for gathering and transmitting information as to physical conditions.

Ideally, such devices are spin stabilized by the gyroscopic forces of a spinning body which, when free to precess, resists the effects of disturbing torques having components about axes normal to the axis of spin. Such spin stabilized devices may include only the spinning body, or may include a second body to which the spinning body is rotatably coupled which, as a practical matter, does not spin but which may make one or a few rotations during a particular cycle or period of operation. In the art as presently known, even though the second body may make one or a few rotations during a particular cycle or period of operation of the spin stabilized device, the second body is said to be "despun."

In the two body configuration of such a device the spinning body is provided for the purpose of spin stabilizing the device and may carry instrumentation or controls which benefit from or are not adversely affected by the spinning movement or forces. The second or relatively stationary body which does not spin provides an additional support for receiving a useful load, such as instruments, which for practical considerations could not be attached to the spinning body.

Spin stabilized devices of the character referred to herein usually involve spinning body constructions which are assembled from a plurality of structural members and as such differ from a rigid solid body construction. Such fabricated spinning bodies in environmental operating conditions at normal spin rates may undergo deflection which varies the mass distribution. In addition, such a fabricated spinning body may carry elements such as instruments, sensors, jet nozzles, etc., which are movable under the control of servos and in this way vary the mass distribution of the spinning body. Other items which may be carried by the spinning body may possess plastic or fluid characteristics, permitting or causing variation in mass distribution in the spinning body assembly.

In the art as presently developed, a rotating body or gyroscopic mass is said to be sensibly rigid when its mass distribution remains effectively unchanged under operating conditions at normal spin rates. An example of such a spinning or rotating body may be a metallic flywheel of a gyroscope, such as the umbrella type rotor of the conventional hysteresis motor driven gyroscope. A gyroscope body or mass may be said to be sensibly nonrigid when under operating conditions at normal spin rates it undergoes an effective change in geometric configuration and a corresponding variation in mass distribution and/or comprises individual masses which, by reason of their attachment to the gyroscopic mass or body or by reason of their inherent physical properties, are movable in the presence of applied forces to vary the mass distribution of the gyroscopic body or mass. Thus, the expression "variable mass distribution" and "sensibly nonrigid" as applied to gyroscopic masses designed to spin about a predetermined axis, denote an arrangement in which the gyroscopic mass is changeable in shape and/or mass sections comprising the gyroscopic mass are physically displaceable in amounts affecting performance as a consequence of any one or more of acceleration forces acting thereon during normal operation, forces resulting from the expending of materials, as by means of jets, forces resulting from mass displacements by means of servos, etc.

It appears that only special cases of the two body devices have been reported in the prior art. The reports are confined to the two body (spun and despun) devices wherein one body was considered to be perfectly rigid. The essential results of these reports are that:

(1) If the spinning body were perfectly rigid, for example, a flywheel, the despun body size is practically limitless;

(2) If the spinning body were not perfectly rigid it is constrained to have a spin moment of inertia which is larger than any other moment of inertia of the entire assembly.

In reference to Item 2 above, due to the sensibly nonrigid characteristic of the spinning body, variations in the mass distribution take place. The energy dissipated in this variation or shift in mass distribution results in forces tending to induce and increase nutational motion of the vehicle. If unchecked, the nutational motion becomes a tumbling motion.

Where such devices or vehicles comprising a sensibly nonrigid rotor are to be used in space, the radius of the spinning body is controlled by the diameter of the booster rocket at the attachment position. Thus, the despun body is limited to some smaller size which produces severe space limitations for the installation of useful load.

Following the design criteria, Item 1 above which utilizes a sensibly rigid spinning body such as a flywheel of sufficient rigidity that the mass distribution remains fixed, at least under normal operating conditions, a stable two body configuration is achievable. Energy dissipation in such a rigid spinning body, for all practical purposes, is below any level tending to introduce or augment nutation. But a rigid flywheel is heavy which is undesirable in most applications and its solid construction largely precludes its use as a carrier of instruments and control systems and devices which benefit from spin, such as spin scan cameras, solar panels, fluid pressure sources, etc.

An object of this invention is to provide an improved stabilized device or vehicle having two or more bodies, in which unwanted angular movement is minimized.

Another object of this invention is to provide an improved stabilized device having two or more bodies of the character referred to in the preceding object in which the size, geometry and weight of the despun body is not limited in relation to similar properties of the spinning body.

According to this invention, stability is obtainable in a two body device, in which the bodies are rotatably coupled and one spins relative to the other even though the spinning body is sensibly nonrigid, i.e., has a variable mass distribution and the moment of inertia about the axis of spin is less than the moment of inertia about another axis or about any other axis of the device. Stability in such a two body device is obtained, unlike the teachings of the prior art aforesaid, by utilizing two sensibly nonrigid bodies in which the spinning body is less nonrigid (i.e., is more rigid) than the despun body in the sense defined by the energy dissipation relation, expression (1) below. In practice this may be achieved by making the despun body less rigid structurally than the spinning body and/or by adding efficient energy dissipating means such as a mass (fluid or solid, or both) movably coupled to the despun body. Thus, kinetic energy in the two body device or vehicle tending to cause instability is given up or dissipated as work done in varying the mass distribution of the despun body. By making the despun body sufficiently dissipative it has been found that stability through energy dissipation may be obtained whereby damping of nutational movement caused by disturbing forces from any source, including forces resulting from varying mass distribution in the spinning body is achieved. In practice, in one operational mode disturbing forces may be applied to the spin stabilized device or vehicle upon forced separation from a launch vehicle used in placing the spin stabilized device in a zero gravity mode of operation, such as an orbital path.

Spin stabilized vehicles constructed in accordance with the teachings of the present invention, therefore, may have a ratio of the moment of inertia about the spin axis to the moment of inertia of about at least any one other axis less than one and may yet employ a despun body of virtually unlimited size while inhering orientation stability.

Other objects and features of the invention will be more fully apparent in the course of the following description and from an examination of the related drawings wherein:

FIG. 1 schematically illustrates a stabilized device or vehicle embodying the principles of this invention;

FIG. 2 schematically depicts a stabilized device or vehicle embodying the principles of this invention showing, additionally, the mounting of various equipment on both bodies;

As described above, the present invention proposes a stabilized device or vehicle construction of the two body type in which the bodies are rotatably coupled and both bodies are sensibly nonrigid. According to one practical embodiment of this invention nonrigidity of the despun body in the degree required for stability is achieved by the addition to the despun body of means to dissipate the energy of angular movement such as nutational or liberatory movement of the vehicle. In one embodiment the energy dissipating means is a passive damper involving a mass, fluid or solid, movably coupled to the despun body. As a passive damper it is unpowered, that is, it is not moved by an active element such as a motor. Energy is dissipated or given up as work done in relatively moving the despun body and the damper mass. The physical coupling between the damper mass and the despun body may be of a character exhibiting resilience and may include restraints imposed frictionally, magnetically or viscously.

Figure 1:
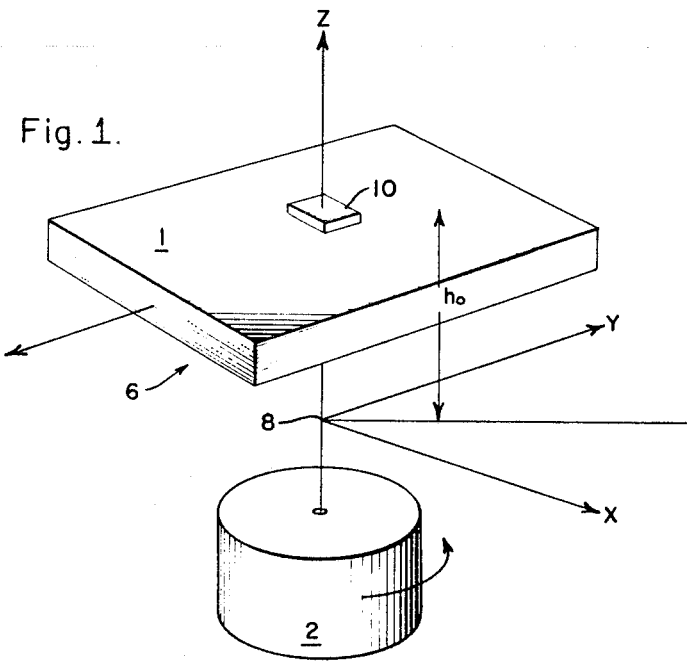

A stabilized vehicle of this general type is schematically shown in FIG. 1 and comprises a pair of rotatably coupled bodies. The body 1 is the despun body and may be of any suitable configuration as dictated by physical space restraints, instrumentation, and the like. The body 2 is the body adapted to be spun. The character of the rotatable coupling between the bodies is not illustrated in the interest of simplicity since it is conventional. Ordinarily, the body adapted to be spun will be of roughly circular cross-section. However, specific applications of the vehicle may dictate other configurations. The center of mass of this stabilized device or vehicle is assumed to be at position 8. Mutually perpendicular axis X and Y intersect the center of gravity in positions perpendicular to the spin axis Z. In accordance with the teachings of this invention both bodies are assumed to be sensibly nonrigid and subject to variable mass distribution under operating conditions and, in reference to the body 2 which is adapted to be spun, at normal spin rates. The moment of inertia of the body 2 in relation to the despun body 1 is less than 1 (one) or unity and the degree of nonrigidity required of body 1 for stability of the vehicle is achieved by the addition of an energy dissipating means 10 in any suitable position on the body 1.

The principle which was recently discovered and provides the theoretical basis for the invention is expressed in relation (1). Relation (1) is a necessary and sufficient condition which must be satisfied to ensure nutational stability of two body craft.

$$\frac{\dot{T}_1}{\lambda_1}+\frac{\dot{T}_{11}}{\lambda_{11}}<0 \tag{1}$$

where:

$$\lambda_1=\frac{C\Omega_1+I\Omega_{11}}{\frac{A+B}{2}}-\Omega_1$$

$$\lambda_{11}=\frac{C\Omega_1+I\Omega_{11}}{\frac{A+B}{2}}-\Omega_{11}$$

$\dot{T}_1$=Internal Energy Dissipation Rate due to relative motilon of mass elements comprising body 1
$\dot{T}_{11}$=Internal Energy Dissipation Rate due to relative motion of mass elements comprising body 2.
C=Moment of Inertia of the body 1 about Z Axis
I=Moment of Inertia of the body 2 about Z Axis
A, B=Total Moments of Inertia about X and Y Axes, respectively.

$\Omega_1$ = Angular Rate of the body 1 about Z Axis (Orbital Rate)

$\Omega_{11}$ = Angular Rate of the body 2 about Z Axis

For practical configurations the angular momentum of the platform due to its once-per-orbit rotation rate is negligibly small even for unrealistically huge platform inertias. For example, in synchronous orbit the platform rate would be $0.72 \times 10^{-4}$ radians/sec. To achieve $\frac{1}{10}$ of the angular momentum of a small satellite, whose inertia is 2 slug ft.$^2$, spinning at 10 radians/sec., the platform inertia would have to be 26,600 slug ft.$^2$, large indeed. Thus condition 1, for most cases of interest, may be written, assuming $A=B$, $$\frac{\dot{T}_1}{\frac{I}{A}} + \frac{\dot{T}_{11}}{\frac{(I-1)}{A}} < 0 \qquad (2)$$

For configurations with large platforms, $$\frac{I}{A} \ll 1$$

Since the dissipation rates, $\dot{T}_1$ and $\dot{T}_{11}$, are negative quantities by definition, stability requires $$\frac{\dot{T}_1}{\frac{I}{A}} > \dot{T}_{11} \qquad (3)$$

or $$\frac{\dot{T}_1}{\dot{T}_{11}} > \frac{I}{A} \qquad (4)$$

To ensure that such a configuration is stable then, the energy dissipation rate on the platform must be greater than the product of the energy dissipation rate in the spinner and the inertia ratio.

To demonstrate the significance of the previous result, a configuration designed for a launch into synchronous orbit, about 1600 pounds, will be analyzed. The satellite consists of a nominal 10 foot diameter spinner weighing 800 pounds carrying an 800 pound platform. Typical parameters for this configuration are $I = 400$ slug ft.$^2$
$A = B = 1000$ slug ft.$^2$
$\Omega_{11} = 100$ r.p.m. $\cong 10$ radians/sec.

The principal energy dissipation mechanism in the spinner is the sloshing of 80 pounds of $H_2O_2$ control fuel distributed in four spherical 12 inch diameter tanks. It is desirable to compute the nutation damper (an energy dissipator) size required on the platform to (1) overcome the destabilizing effect of the propellant and (2) provide acceptable nutation damping performance.

It is known that the energy dissipation rate of a sloshing, half-filled tank of fluid is given conservatively by $$\dot{T} = \frac{1}{2} \left(\frac{Ml}{I_f \sigma}\right)^2 \cdot \frac{B a_z^2}{\left(\frac{\omega_n^2}{\sigma^2} - 1\right)^2 + \left(\frac{B}{I_f \sigma}\right)^2} \qquad (5)$$

where for this case:

M = Mass of fluid = 20 pounds
a = Radius of tank = 0.5 feet $I_f = \frac{2}{5} Ma^2 = 0.066$ slug ft.$^2$ $l = 3/8 a = 0.187$ feet $\omega_n = \sqrt{\frac{15}{16} \cdot \frac{x_0 \Omega_{11}^2}{a}} = 19.4$ radians/sec.

$x_0$ = Radial location of tank = 2 ft.

$\sigma = \left(\frac{I}{A} - 1\right) \Omega_{11} = \lambda_{11} = 0.6 \Omega_{11} = 6$ radians/sec.

$a_z = x_0 = \left(\frac{I}{A} - 2\right) \Omega_{11} \cdot \omega = 32\omega$ ft./sec.$^2$ $\omega$ = Transverse angular rate due to mutation $B = \frac{4}{3} \pi a^4 \left(\frac{\sigma \rho \mu}{2}\right)^{1/2} = 0.0039$ ft. lb. sec.

$\rho$ = Density of fluid = 1.392 $\frac{\text{gm.}}{\text{cm.}^3}$ $\mu$ = Viscosity of fluid = 0.0134 $\frac{\text{gm.}}{\text{cm.}}$ sec.

} 90% $H_2O_2$ at 18° C.

The energy dissipation rate for one tank is then $$\dot{T} = 2.4 \times 10^{-3} \omega^2 \frac{\text{ft. lb.}}{\text{sec.}}$$

For the vehicle, with four tanks $$\dot{T}_{11} \cong 10^{-2} \omega^2 \frac{\text{ft. lb.}}{\text{sec.}} = k\omega^2 \qquad (6)$$

If no nutation damper were present on the platform, the nutation amplitude divergence time constant due to propellant sloshing is given by solution of the following equation, $$A \omega \dot{\omega} = \frac{\lambda_0}{\lambda_{11}} \cdot \dot{T}_{11} = \frac{\lambda_0}{\lambda_{11}} \cdot k\omega^2 \qquad (7)$$

and $$\dot{\omega} = \frac{\lambda_0}{A \lambda_{11}} \cdot k\omega$$

thus $$\omega = \omega_0 e^{\frac{\lambda_0 k}{A \lambda_{11}} \cdot t}$$

or $$\tau \text{ divergence} = \frac{A \lambda_{11}}{\lambda_0 k} = 150,000 \text{ seconds} = 41.5 \text{ hours}$$

We now compute parameters of a passive damper required to overcome the propellant effect and provide a damping time constant of one minute. We shall assume a simple spring-mass-dashpot damper such as the damper shown in FIG. 6. The time constant for such a damper is given by, $$\tau = \left(\frac{A}{m h_0^2}\right) \cdot \frac{2\beta}{\lambda_1^2} \qquad (8)$$

where a damper resonant at the frequency $$\frac{I}{A} \Omega_{11} = \lambda_1$$

is assumed.

Letting the damper location to be at $h_0 = 3$ ft. (height above center of mass of spacecraft)

$$\tau = 14 \frac{\beta}{m} \text{ seconds}$$

Thus for 60 second performance $$\frac{m}{\beta} \cong 0.25$$

The required spring restoring force is $$k = m \lambda_1^2 = 16 \ m. \text{ lb./ft.}$$

For a damper mass weight of 4 pounds $$k = 0.166 \text{ lb./in.}$$

representing an easily wound spring. The damper constant required is $$c = m\beta = 4 \ m^2 = 0.062 \text{ lb. sec./ft.}$$

also representing a quite nominal dashpot. The total weight of the damper including the viscous fluid would be about 6 pounds.

The computations illustrate quantitatively the relative effects of a reasonably sized nutation damper located on a despun platform and large propellant loadings in the spinning body.

Figure 2:
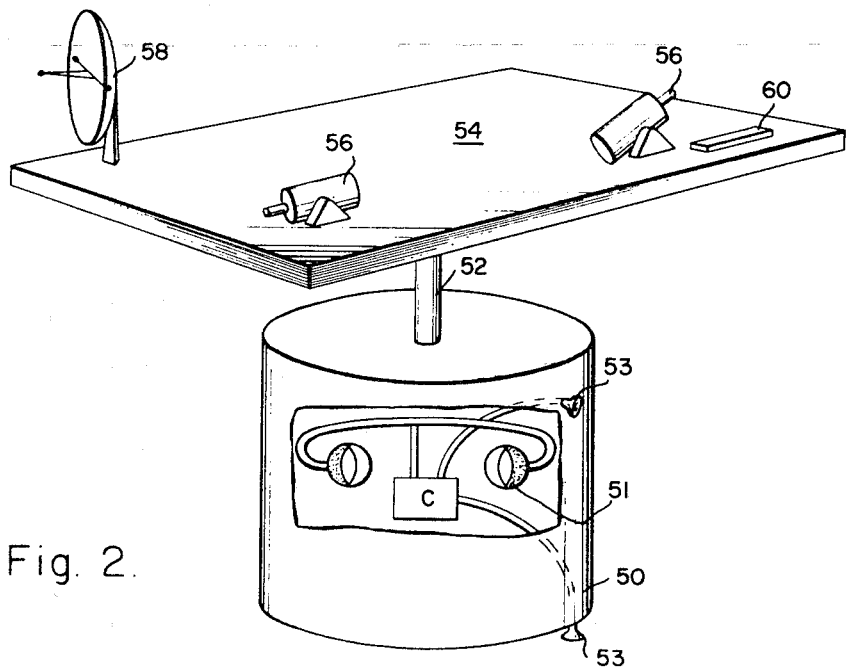
Figure 3:
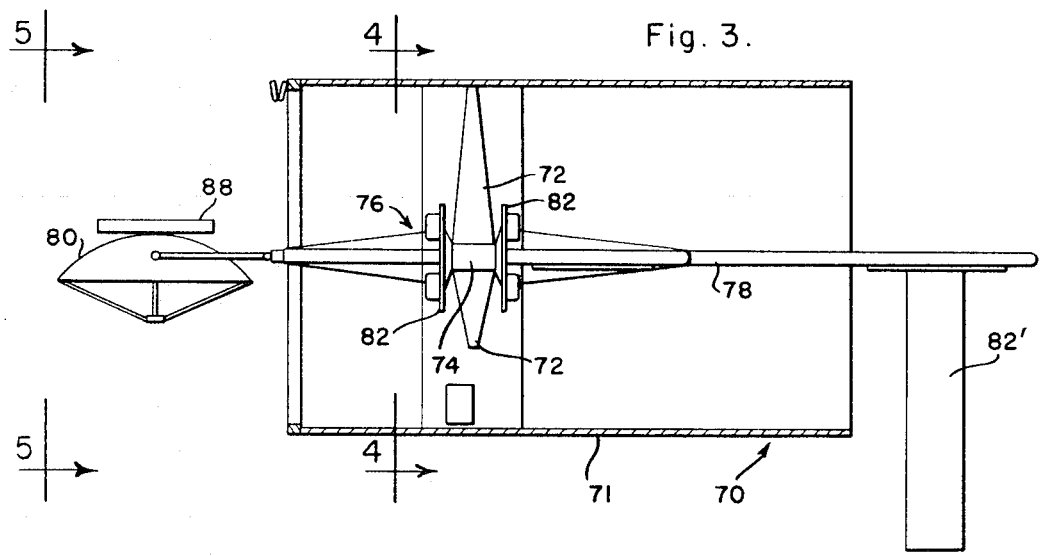
FIG. 3 is a side elevational view partially in longitudinal section of a stabilized device or a vehicle such as a space craft and showing portions of the despun body at opposite ends of the vehicle.

In the arrangement illustrated in (FIG. 2) control devices and instruments are illustrated. Here, the spinning body 50 is rotatably coupled about a shaft 52 to a despun body such as a platform or support 54. The spinning body is provided with nozzles 53. Nozzles 53 on the bottom of the spinning body is utilized to control precesssion, whereas the nozzle 53 on the right side of the spinning body as viewed may be characterized as a control nozzle which, according to accepted practice, provides a force which acts through the center of the mass of the vehicle and is utilized to control velocity as required. Conventionally, these nozzles may be supplied with fluid pressure from tanks such as the tanks 51 shown internally of the rotatable body 50. Ordinarily, hydrogen peroxide is used as the fluid medium. A control unit C, the details of which are not shown in the interest of simplicity, selectively couples the hydrogen peroxide tanks to the nozzles 53. The reaction forces of the hydrogen peroxide jets produces the forces or torques which are used to control the velocity and attitude of the vehicle, respectively.

The despun body 54 may mount a variety of instruments. Those bearing the reference character 56 may be star telescopes or meteorological cameras, while an antenna 58 is mounted on one corner of the platform. It will be appreciated these are very elementary indications of instrumentation carried by such a despun body.

Figure 7:
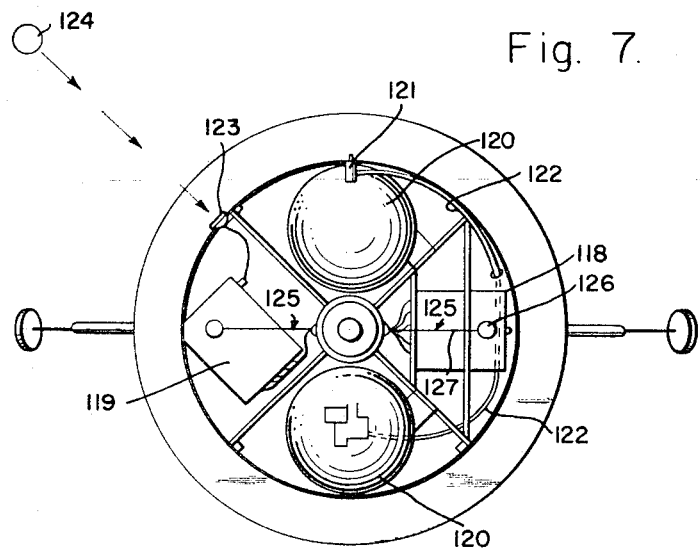
FIG. 7 is a plan view of one practical embodiment of this invention which has been built and operated.
Figure 8:
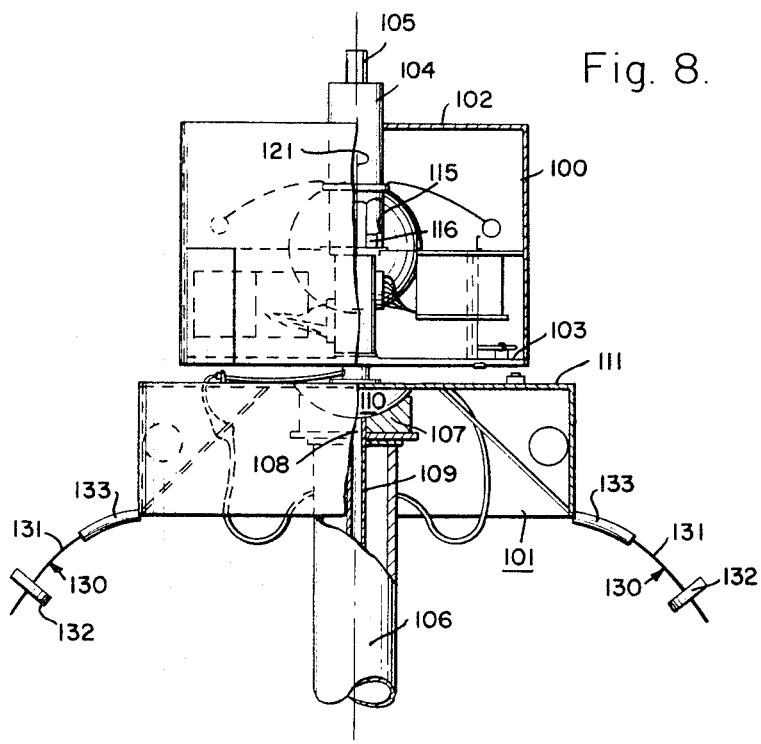
FIG. 8 is an elevation view fragmentarily in section of the embodiment of the invention of FIG. 7.

As will be noted in connection with FIGS. 7 and 8, yet to be described, an electric motor is utilized to spin the rotatable body 50. Ordinarily, a sensor, such as an infrared sensitive device or other light sensor, is utilized to sense the sun or other light or heat emitting body, the output of which is utilized in connection with a control system, not shown, to control the motor so that a change in angular rate, increasing or decreasing, between the bodies takes place so that the despun platform is properly positioned. This control may also be utilized in connection with the precession jet in the event orientation of the despun body about an axis other than the spin axis is also required. Such systems are conventional.

Here, again, both the despun and the rotatable bodies are of the nonrigid variety and the ratio of the moment of inertia about the spin axis to the moment of inertia about another axis, or any other axis, of the vehicle is less than unity or one. Stability is achieved by the application of a damping member 60 which may include a spring mounted fluid damped mass of the type illustrated in FIG. 6, yet to be described to damp nutation however caused. As discussed hereinbefore, a body such as the rotatable body 50 by reason of its construction may be identified as sensibly nonrigid because of changes in geometric configuration in the presence of operating forces at normal spin rates. The addition of fluids such as propellant fluids in the tanks 51 which tend to slosh adds to the sensible nonrigidity of the configuration. The character of construction of the despun body is ordinarily such that it is sensibly nonrigid in the presence of operating forces. The selection of a damper 60 damps nutation which normally occurs at some subharmonic frequency of the spin frequency or rate and thereby stabilizes the device.

FIGS. 3 through 6 illustrate pertinent details of a stabilized vehicle embodying the principles of this invention and of a type particularly adapted for a zero gravity mode of operation, for example, an orbital path. The vehicle 70 comprises a generally cylindrical shell 71 supported on spiders or arms 72 journalled for rotation on a suitable bearing structure 74 carried by the despun body or support generally identified as 76. The despun support has shaft extension 78 extending axially therefrom in both directions through the ends of the cylindrical shell, one of which mounts a microwave antenna 80 and the other of which mounts a unit which may be a UHF antenna 82'. Plates such as the plates 82 may be carried by the stationary body for the purpose of mounting appropriate equipment.

Figure 4:
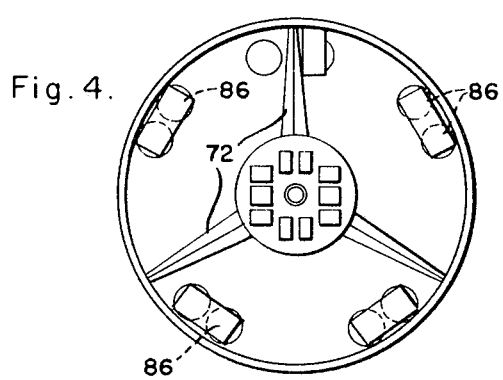
FIG. 4 is a sectional view taken along the line 4—4 of FIG. 3.
Figure 5:
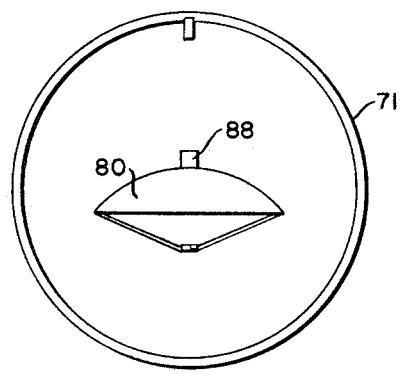
FIG. 5 is an end elevational view viewed from the left end of the device as seen in FIG. 3.

FIG. 4 shows a general configuration of the arms or spiders 72 forming part of the rotating body structure. This view illustrates a plurality of spherical tanks 86 secured internally of the cylindrical shell. These tanks may carry any suitable fluids for use by the vehicle in flight. The fluids may be in the nature of a fuel such as hydrogen peroxide which is appropriately exhausted through nozzles, not shown, for the purpose of controlling the attitude and the velocity of the craft. As earlier noted, it is the sloshing of the fluids in tanks such as the tanks 86 which is a contributing factor in the sensible nonrigidity characteristic of the rotating body and contributes in the dissipation of energy which can induce or augment craft nutation.

In this embodiment of the invention unwanted angular movement or oscillation such as nutation is damped by means of a nutation damper 88 which may be located in any suitable position on the despun body 76. In this instance, as will be seen in FIGS. 3 and 5, the damper 88 is mounted on the back of the dish of the microwave antenna 80.

Figure 6:
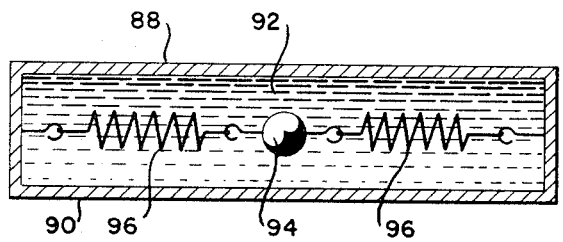
FIG. 6 is a longitudinal sectional view of the passive nutation damper employed in the stabilized vehicle of FIGS. 3-5.

The details of the damper 88 representing one type of damper useable in this application appears in FIG. 6. Here, a mass 94 is spring mounted substantially centrally between the ends of a container or housing 90 which is filled with a suitable fluid 92. Two tension springs 96 mount the mass 94 which represents only one of several ways of supporting the mass. For instance, the springs could be compression springs with the mass supported therebetween. Instead of extending longitudinally of the container 90 the springs, whether of the tension or compression variety, may extend transversely of the container. Although coil springs have been shown, cantilever springs may also be used appropriately positioned. The fluid 92 viscously damps movement of the mass 94 relative to the container 90. Thus, energy is dissipated in displacing the solid and viscous fluid masses.

Acceleration or oscillatory movement of the craft displaces the damper. The mass 94 tends to remain stationary when this happens. The relative movement is damped by the displacement of the viscous fluid. By this expedient the sensible nonrigidity of the despun body is increased and the energy which is dissipated in the structure is largely given up as work done in effecting relative displacement of the parts of the damper. Thus, the kinetic energy of motion in the vehicle is dissipated. Effective damper parameters and time constants are easily determined knowing the masses of the bodies constituting the vehicle and the spin rate of the spinning body. Nutation ordinarily takes place at a frequency which is a subharmonic of the spin frequency or rate.

It is to be emphasized that the invention is not limited to the use of resiliently supported viscously damped masses of the type shown in FIG. 6. Frictionally or magnetically coupled relatively movable members may also function as suitable dampers. In this regard nonrigid structures per se may be used as energy dissipating devices. Likewise, fluids of suitable viscosity, suitably contained may function in this capacity. Additionally, a flexible piece of useful structure may function as a damper.

FIGS. 7 and 8 show a practical embodiment of this invention which was built and tested. This stabilized vehicle again comprises two bodies which are rotatably coupled. The upper body 100 as viewed in FIG. 8 is the spinning body and the lower body 101 is the despun body. In this embodiment both bodies are of generally cylindrical configuration comprising cylindrical surface shells which are joined to a central supporting structure. In this respect the spinning body 100 comprises upper and lower plates 102 and 103 peripherally joined to the surface shell and coupled to a central tubular support 104. This structure is fitted over a shaft 105, the lower end of which is secured to an upper face plate 111 of the despun body 101. A tubular standard 106, the upper end of which terminates in a concave spherical bearing structure 107, has an opening 108 through its surface communicating with a tube 109 through which air under pressure is supplied. This structure functions as the lower portion of an air bearing assembly, the upper portion of which comprises a convex spherical bearing 110 which is connected to the bottom side of the upper face plate 111 of the despun body 101. When air of sufficient pressure is admitted to this bearing assembly via the tube 109 and the opening 108 into the region of the confronting bearing faces, the upper bearing section 110 is lifted and rides on a thin film of air. Thus, the entire vehicle including the spinning and the despun bodies is maintained in an elevated position and for all practical purposes is spatially free.

A conventional direct current motor comprising the relatively rotatable members 115 and 116, one of which is coupled to the tube 104 and the other of which is coupled to the shaft 105, is used to drive the spinning body at a spin velocity of about 2.5 to 3.5 revolutions per second.

In this embodiment of the invention the spinning body or rotor mounts a variety of equipment. As will be seen in FIG. 7, the equipment includes two control electronics packages 118 and 119, respectively, the details of which are not described since they are not important. Additionally, two tanks 120 in diametrically disposed positions are mounted internally of the shell of the spinning body and contain gas such as nitrogen under pressure which is utilized to control the attitude of the vehicle. To this end a radial jet 121 has a nozzle directed radially from the spinning body in a position adjacent its upper end. This nozzle communicates with the nitrogen under pressure by means of tubes 122 which couple the tanks to suitable control devices in the electronics control package 118 on the right as seen in FIG. 7, which in turn couples the gas under pressure to the radial jet 121. The function of the jet is to torque the vehicle about the air bearing assembly to cause precession response in a direction to change the attitude of the vehicle as required. A light sensor 123 is utilized to detect a suitable light source 124 on which the despun body or platform locks. In accomplishing this lockup operation the output of the light sensor 123 is coupled into the electronics control indicated on the left of the vehicle as seen in FIG. 7. The output of this electronic control among other applications is coupled to the DC motor to increase or decrease the torque as required to change the angular position of the despun platform in space about the spin axis.

The structure of the spinning body or rotor as described is classified as sensibly nonrigid. Nonrigidity is increased by the addition of nutation drivers generally designated 125. Each driver comprises a mass 126 supported on the end of a long spring rod 127 projecting radially from the central tubular support 104. The masses are disposed in diametrically opposite positions at equal radii.

In operation nutation is introduced by momentarily torquing the vehicle about an axis other than the spin axis. The spin moment of inertia of the rotating structure or rotor is less than the moment of inertia about any other axis of the vehicle. As spin continues, nutation continues, and is observed to increase, occurring at a frequency which is a subharmonic of the spin rate.

Nutation is completely damped by means of nutation dampers generally designated 130 which are attached in diametrically disposed positions to the despun body. The nutation dampers each comprise a spring rod 131 to the end of each of which as mass 132 is attached. Damping material, a viscous or plastic material, an example of a plastic material being putty, enclosed in a tube surrounds each of the spring rods 131 in a position near the despun body. Thus, energy is dissipated in the mass system.

Table 1

| Parameter— | Valve |
|---|---|
| Rotor dimensions: | |
|    Diameter _____inches__ | 25.2 |
|    Length _____do____ | 18.0 |
| Platform dimensions: | |
|    Diameter _____do____ | 32.2 |
|    Length _____do____ | 10.0 |
| Inertias: | |
|    Rotor spin inertia _____slug-ft.$^2$__ | 1.60 |
|    Platform roll inertia _____do____ | 3.15 |
|    Total assembly pitch (yaw) inertia __do____ | 3.22 |
| Total model weight _____pounds__ | 184 |
| Rotor spin velocity _____rev./sec__ | 2.5–3.5 |
| Despun platform control system: | |
|    Steady state pointing accuracy _____degree__ | 1 |
|    Pointing jitter _____degrees__ | <.25 |
|    Natural frequency _____c.p.s__ | ~.16 |
|    Damping factor _____ | ~.7 |
|    Gain margin _____ | 2 |
|    Phase margin _____degrees__ | >40 |
|    Bearing and brush friction _____oz.-in__ | 23 |
|    Maximum control torque _____ft.-lb__ | .57 |
| Cold gas system: | |
|    Maximum precession capability degrees/sec__ | ~.3 |
|    Operating time _____minutes__ | ~5 |
| Dampers: | |
|    Damper mass _____pounds__ | 1.13 |
|    Natural frequency _____c.p.s__ | 1.5 |
|    Damping factor _____ | 0.025 |
| Propellant simulators: | |
|    Mass _____pounds__ | .14 |
|    Natural frequency _____c.p.s__ | 1.5 |

Although several embodiments of this invention have been illustrated and described, it will be appreciated that the invention is susceptible of further modification without departing from its spirit and scope. In this regard the disclosure develops a general concept of stability for a vehicle adapted for operation in a free spatial environment and comprising a pair of relatively rotatable nonrigid bodies in which the ratio of the spin moment of inertia, with respect to the moment of inertia about any other axis of the body, is less than unity or one.

I claim:
1. A stabilized device comprising:
   a body;
   a sensibly nonrigid gyroscopic mass coupled to said body to spin in one direction about a spin axis, and having a spin moment of inertia about said spin axis which is less than the moment of inertia of said device about another axis;
   said body being despun relative to said gyroscopic mass; and
   mechanical energy-dissipating means coupled to said body.

2. A device as set forth in claim 1 in which said energy-dissipating means comprises a mass resiliently coupled to said body.

3. A device as set forth in claim 2, wherein said energy-dissipating means further includes damping means.

4. A device as set forth in claim 1 in which said energy-dissipating means comprises a mass movably coupled to said body.

5. A device as set forth in claim 4, wherein said energy-dissipating means further includes damping means.

6. A vehicle adapted for spin stabilization comprising in combination:
   at least a pair of bodies;
   means interconnecting said bodies to accommodate rotation of one body relative to the other body about an axis;
   said one body having a spin moment of inertia about said axis which is less than the moment of inertia of said vehicle about another axis;

nonrigid energy-dissipating means carried by said one body and movable relative thereto; whereby a nutational inducing force is applied to said one body; and a mass movably coupled with said other body for damping said nutation.

7. A device as set forth in claim 6 wherein said energy-dissipating means is a fluid.

8. A vehicle comprising:
a body;
a gyroscopic mass rotatably coupled to said body;
means having a mass movably coupled with said gyroscopic mass in force-transmitting relationship, whereby movement of said means produces a variation in the mass distribution which variation induces libratory forces;
and enrgy-dissipating means having a mass less than the mass of the means carried by said body and movable relative thereto in response to said libratory motion to apply a force to said vehicle to dampen and eliminate said libratory motion.

9. In a craft adaptable for flight above the earth said craft comprising at least a pair of bodies,
means interconnecting the bodies to accommodate rotation of one body relative to the other body,
said one body being adapted to rotate relative to the other body and thereby provide a gyroscopic effect on the craft in flight and maintain the orientation thereof,
non-rigid energy-dissipating means carried by the one body and movable relative thereto during flight,
said movement being effective to apply the energy to the one body and thereby induce nutation of the craft and effect a change in said orientation,
and other movable energy-applying means carried by the other body and movable in response to said nutation and effective to apply energy to the craft and dampen said nutation and correct said orientation.

10. In a craft adaptable for flight above the earth,
a spinnable element,
a non-spinning element pivotally connected to the spinnable element to accommodate rotation of the latter,
energy-dissipating means on the spinnable element movable in response to said spinning to apply energy thereto and change the orientation of the axis of spin,
and other energy-dissipating means on the non-spinning element movable in response to said change in orientation to thereby exert energy on the non-spinning element and return the axis of spin to its original orientation.

11. In a vehicle,
a generally cylindrical hollow first body,
said body having bearing means located centrally of said hollow body,
a second body connected to said hollow body via said bearing means,
said bearing means accommodating rotation of said hollow body relative to the non-rotating second body,
movable means carried by said hollow body and upon movement thereof relative to said hollow body operative to dissipate energy to the hollow body and thereby induce a libratory motion of said vehicle,
and other energy-dissipating means carried by the second body and movable relative thereto in response to said libratory motion to thereby apply energy to said second body and dampen and eliminate said libratory motion.

12. A vehicle according to claim 11, wherein said other energy-dissipating means is a passive nutation damper.

13. A craft according to claim 10, wherein the spin moment of inertia of the spinnable element about its axis of spin is less than the moment of inertia of the craft about another axis.

14. A vehicle according to claim 11, wherein the ratio of the moment of inertia of the rotating hollow body about its axis of rotation to the moment of inertia of the entire vehicle about any other axis is less than one.

15. A stabilized device comprising:
a body;
a nonrigid gyroscopic mass rotatably coupled to said body to spin in one direction and having a spin moment of inertia which is less than any other moment of inertia of said device;
said body being despun relative to said gyroscopic mass; and
mechanical energy-dissipating means coupled to said body.

16. A device as set forth in claim 10 in which said other energy-dissipating means comprises a mass resiliently coupled to said non-spinning element.

17. A device as set forth in claim 11 wherein said other energy-dissipating means further includes fluid damping means.

18. A stabilized vehicle comprising in combination at least a pair of bodies;
means interconnecting said bodies to accommodate rotation of one body relative to the other;
nonrigid energy-dissipating means carried by said one body and movable relative thereto;
whereby a nutation inducing force is applied to said one body;
and a mass movably coupled with said other body for damping said nutation.

19. A device as set forth in claim 12 wherein said other energy-dissipating means is a fluid.

20. A vehicle comprising:
a body;
a gyroscopic mass comprising a generally cylindrical shell rotatably coupled to said body;
means movably coupled with said shell in force-transmitting relationship, whereby movement of said means produces a variation in the mass distribution which variation produces libratory motion;
and energy-dissipating means carried by said body and movable relative thereto in response to said libratory motion to apply a force to said vehicle to dampen and eliminate said libratory motion.

21. In a craft adaptable for flight above the earth,
said craft comprising at least a pair of bodies,
means interconnecting the bodies to accommodate rotation of one body relative to the other body,
said one body being adapted to rotate relative to the other body and thereby provide a gyroscopic effect on the craft in flight and maintain the orientation thereof,
nonrigid energy-dissipating means carried by the one body and movable relative thereto during flight,
said movement being effective to apply the energy to the one body and thereby induce nutation of the craft and effect a change in said orientation,
said other body comprising other energy-applying means movable in response to said nutation and effective to apply energy to the craft and dampen said nutation and correct said orientation.

22. A stabilized device comprising:
a sensibly nonrigid rotor rotatable about a spin axis;
a despun body coupled to said sensibly nonrigid rotor;
said rotor and said despun body being of configuration such that said rotor has a spin moment of inertia about said spin axis which is less than the moment of inertia of the device about another axis;
said device possessing inertial distribution asymmetry with respect to the rotor spin axis; and
means to provide rotational control of the despun body about the spin axis to provide damping of nutation of said device by utilizing to advantage the natural dynamic coupling between the despun body rotation and the nutational motion of the device.

23. A stabilized device comprising:
a sensibly nonrigid rotor rotatable about a spin axis;
a despun body coupled to said sensibly nonrigid rotor;
said rotor and said despun body being of configuration such that said rotor has a spin moment of inertia about said spin axis which is less than the moment of inertia of the device about another axis;

said device possessing mass distribution asymmetry with respect to the rotor spin axis; and means to provide rotational control of the despun body about the spin axis to provide damping of nutation of said device by utilizing to advantage the natural dynamic coupling between the despun body rotation and the nutational motion of the device.

References Cited

UNITED STATES PATENTS

| | | | |
|---|---|---|---|
| 3,034,745 | 5/1962 | Stewart | 244—1 |
| 3,249,321 | 5/1966 | Newkirk et al. | 244—1 |
| 3,270,984 | 9/1966 | Rice | 244—1 |
| 3,277,486 | 10/1966 | Kuebler | 244—1 X |

FERGUS S. MIDDLETON, *Primary Examiner.*

U.S. Cl. X.R.

244—3.23

PO-1050
(5/69)

UNITED STATES PATENT OFFICE
CERTIFICATE OF CORRECTION

Patent No. 3,442,468      Dated May 6, 1969

Inventor(s) Anthony J. Iorillo

It is certified that error appears in the above-identified patent and that said Letters Patent are hereby corrected as shown below:

Page 1 of 2

Col. 4, line 69, "motilon" should be --motion--.
Col. 5, line 12, "1" should be --(1)--.
Col. 6, line 2, remove second "=";
      line 3, "mutation" should be --nutation--;
      line 37, "41.5 hours" should be underlined.
Col. 7, line 7, "precesssion" should be --precession--;
      line 54, "adds" should be --add--.
Col. 9, line 71, "as" should be --a--.
Col. 10, before Table 1, insert:

--The essential parameters of this embodiment of the invention are given below:--.

Col. 11, line 16, "enrgy" should be --energy--.

Additionally, the following obvious mathematical errors not noticed in the prosecution are present and should be corrected:

Col. 5, Equation (5), line 60, "$\dot{T}$" should be --$\dot{T}_{11}$--;
      also, in both the numerator and in the denominator, "B" should be --H--;
    line 66, "0.066" should be --0.0625--;
    line 74, "6 radians/sec." should be -- -6 radians/sec.--.

3,442,468

(2)

Col. 6, line 2, "32ω" should be -- -(32ω)--;
line 3, after "mutation" (corrected above to nutation) insert --in $\frac{radians}{sec.}$--;

line 5, "B" should be --H--;
line 5, "0.0039" should be --0.0126--;
line 5, after "sec." add -- where H = angular momentum of fluid--;

line 15, "$\dot{T}$" should be --$\dot{T}_{11}$--;

line 59, "≅" should be --=--; and
"0.25" should be --0.234--;
line 69, "0.062" should be --0.0625--.

Signed and sealed this 8th day of June 1971.

(SEAL)
Attest:

EDWARD M. FLETCHER, JR.
Attesting Officer

WILLIAM E. SCHUYLER, JR.
Commissioner of Patents